(12) United States Patent
Klase et al.

(10) Patent No.: US 11,346,540 B2
(45) Date of Patent: *May 31, 2022

(54) SYSTEMS AND METHODS FOR A HEAT SINK

(71) Applicant: Fluence Bioengineering, Inc., Austin, TX (US)

(72) Inventors: Nicholas Klase, Driftwood, TX (US); Randall Johnson, Austin, TX (US)

(73) Assignee: Fluence Bioengineering, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,146

(22) Filed: Oct. 1, 2019

(65) Prior Publication Data

US 2020/0032993 A1 Jan. 30, 2020

Related U.S. Application Data

(63) Continuation of application No. 15/950,951, filed on Apr. 11, 2018, now Pat. No. 10,571,113, which is a continuation of application No. 15/215,923, filed on Jul. 21, 2016, now Pat. No. 9,970,649.

(60) Provisional application No. 62/196,731, filed on Jul. 24, 2015.

(51) Int. Cl.
*F21V 29/00* (2015.01)
*F21V 29/76* (2015.01)
*A01G 9/24* (2006.01)
*F21Y 115/10* (2016.01)

(52) U.S. Cl.
CPC ............ *F21V 29/763* (2015.01); *A01G 9/249* (2019.05); *F21Y 2115/10* (2016.08); *Y02A 40/25* (2018.01)

(58) Field of Classification Search
CPC ...... F21V 29/70; F21V 29/74; F21V 23/0442; F21V 29/763; F21V 15/015; F21V 29/83
USPC .................................. 362/249.02, 373, 294
See application file for complete search history.

(56) References Cited

U.S. PATENT DOCUMENTS

| 2,716,802 | A | 9/1955 | Greer, Jr. |
| 3,261,964 | A | 7/1966 | Grossinger |
| 3,373,803 | A | 3/1968 | Steinberg |
| 4,383,575 | A | 5/1983 | Bobrowski |
| 4,467,179 | A | 8/1984 | Ali |

(Continued)

FOREIGN PATENT DOCUMENTS

| WO | 2006102785 A1 | 10/2006 |
| WO | 2011090311 A2 | 7/2011 |

OTHER PUBLICATIONS

Schütt, E., "Thermal Management and Design Optimization for a high power LED Work Light", Degree Thesis in Plastics Technology, Arcada Univ. Applied Sci. (Helsinki), Sep. 11, 2014 (72 pp., color); see i.a. Fig. 16 (p. 38).

(Continued)

*Primary Examiner* — Jamara A Franklin
(74) *Attorney, Agent, or Firm* — Edward Podszus

(57) ABSTRACT

Embodiments disclosed herein describe systems and methods for heat sinks within light fixtures. In embodiments, the heat sink may be a passive system that creates a cross-flow thermal management system to dissipate large amounts of heat in a slim light fixture. Embodiments may utilize a series of wings assembled in a linear design that are positioned perpendicular to the length of the light fixture to preserve the cross-flow heat sink.

55 Claims, 6 Drawing Sheets

(56) References Cited

U.S. PATENT DOCUMENTS

| | | | |
|---|---|---|---|
| 4,729,076 | A | 3/1988 | Masami |
| 5,857,767 | A | 1/1999 | Hochstein |
| 6,301,779 | B1 | 10/2001 | Azar |
| 6,308,771 | B1 | 10/2001 | Tavassoli |
| 6,749,009 | B2 | 6/2004 | Barten |
| 7,267,461 | B2 | 9/2007 | Kan |
| 7,270,446 | B2 | 9/2007 | Chang |
| 7,278,761 | B2 | 10/2007 | Kuan |
| 7,311,140 | B2 | 12/2007 | McCullough |
| 7,438,449 | B2 | 10/2008 | Lai |
| 7,654,702 | B1 | 2/2010 | Ding |
| 7,665,864 | B2 | 2/2010 | Zheng |
| 7,753,568 | B2 | 7/2010 | Hu |
| 7,766,514 | B2 | 8/2010 | Chen |
| 7,952,262 | B2 | 5/2011 | Wilcox |
| 7,967,474 | B2 | 6/2011 | Ghim |
| 7,990,062 | B2 | 8/2011 | Liu |
| 8,063,485 | B1 | 11/2011 | Azar |
| 8,125,782 | B2 | 2/2012 | Azar |
| 8,262,256 | B2 | 9/2012 | Biebl |
| 8,322,892 | B2 | 12/2012 | Scordino |
| 8,350,450 | B2 | 1/2013 | Tsao |
| 8,628,218 | B2 | 1/2014 | Yu |
| 8,680,754 | B2 | 3/2014 | Premysler |
| 9,108,261 | B1 | 8/2015 | Patrick |
| 9,970,649 | B2 | 5/2018 | Klase et al. |
| 2002/0108743 | A1 | 8/2002 | Wirtz |
| 2006/0198147 | A1 | 9/2006 | Ge |
| 2008/0149305 | A1 | 6/2008 | Chen |
| 2012/0104977 | A1* | 5/2012 | McKenzie ............ A01G 7/045 315/312 |
| 2013/0088871 | A1 | 4/2013 | Yun |
| 2014/0338878 | A1 | 11/2014 | Tessnow |

OTHER PUBLICATIONS

Lee, S., "How to Select a Heat Sink", Design, Heat Sinks, No. 1, Semiconductor, Test & Measurement, Jun. 1, 1995 (11 pp., color); see i.a. p. 7, first full paragraph after Table 3.

"Heat Sink—Manufacturing Technologies" (Qpedia, Nov. 2010), pp. 22-26, see i.a. Fig. 7 (5 pp., color).

"Choosing and Fabricating a Heat Sink Design" (Qpedia, May 2008), pp. 18-23, see i.a. Fig. 1 (6 pp., color).

Lee, S., Optimum Design and Selection of Heat Sinks, 11th IEEE SEMI-THERM Symposium, 1995, pp. 48-54 (7 pp.).

"An Introduction to Heatsinks and Cooling", Wakefield Engineering, V1.01, dated Apr. 1, 2004, see i.a. Sec. 4.6, at URL http://robots.freehostia.com/Heatsinks/HeatsinksBody.html visited Aug. 28, 2018 (14 pp., color).

Sim, et al., "Fanless Cooling for Embedded Applications", Intel Corp., Jan. 2009 (22 pp., color).

Snow Dragon, 180W LED Tunnel Light Heat Sink-SD180, 2 pp., Mar. 19, 2016 (date alleged, 3rd party citation parent appln).

LumiGrow,Quick Start Guide for the LumiGrow LumiBar, 4 pp. © 2012 (date alleged, cited by 3rd party in parent appln).

Lumigrow, LumiGrow LumiBar Pro LED Strip Light, 2 pp., © 014 (date alleged, cited by 3rd party in parent appln.).

\* cited by examiner

SYSTEMS AND METHODS FOR A HEAT SINK

CROSS-REFERENCE TO RELATED APPLICATIONS

This application is a continuation of application Ser. No. 15/950,951, filed Apr. 11, 2018, pending, which is a continuation of Ser. No. 15/215,923, filed Jul. 21, 2016, now granted U.S. Pat. No. 9,970,649, issued May 15, 2018, which claimed a benefit of priority under 35 U.S.C. § 119 to Provisional Application No. 62/196,731 filed Jul. 24, 2015, each of which is fully incorporated herein by reference in their entirety.

BACKGROUND INFORMATION

Field of the Disclosure

Examples of the present disclosure are related to systems and methods for a heat sink. More particularly, embodiments disclose a light fixture with a heat sink configured to dissipate heat caused by the light fixture, wherein the heat sink includes wings that are positioned perpendicular to a central axis of the light fixture.

Background

Greenhouses are buildings or complexes in which plants are grown. For various reasons including price, it is typically ideal for greenhouses to operate with as much natural sunlight as possible. To supplement natural light from the sun, high powered lights are used within greenhouses when the sun or other natural light does not provide enough light for optimal plant growth.

However, the operation of the high powered lights is more costly than utilizing free sunlight. More so, conventional high powered lights are larger in size, which blocks the incoming free sunlight. Furthermore, the blocking of the incoming sunlight causes shading on the plants within the greenhouse, which negatively impacts the grower's productivity.

Although light emitting diodes (LEDs) are more efficient than traditional high powered lights, their manufacturing costs are higher. Additionally, the LEDs cause excessive shading based on requiring larger fixtures to dissipate heat. To circumvent the large fixtures required to dissipate the heat, some manufacturers have attempted to build smaller LED fixtures that use active cooling fans. However, in greenhouse environments, active cooling fans quickly clog with dirt, bugs, etc. This causes the LED fixtures with active cooling fans to quickly become inoperable.

Conventional LED fixtures that do not include active cooling fans use traditional linear heat sinks. However, traditional linear heat sinks include wings that extend in a direction parallel with a central axis of the conventional LED fixtures. Heat generated through conventional LED fixtures may dissipate based on convection, conduction or radiation. However, due to LED fixtures being suspended, there is minimal heat dissipation via conduction. Radiation is a function of the fixture temperature and may be significant, and convection is the primary method to dissipate heat. In applications, air particles remove heat from the fixture through air movement. For longer heat sinks, air movement within the middle of the fixtures is minimal. This severely limits the amount of power conventional LED fixtures can consume because additional power consumption leads to more heat.

Accordingly, needs exist for more effective and efficient systems and methods for a heat sink within a light fixture including wings that are positioned perpendicular to the central axis of the light fixture, wherein the heat sink creates a cross-flow thermal management system dissipating larger amount of heat in slimmer fixtures.

SUMMARY

Embodiments disclosed herein describe systems and methods for heat sinks within light fixtures. In embodiments, a heat sink may be a passive system that continually and passively creates a cross-flow thermal management system dissipating large amounts of heat in a slim light fixture. Embodiments may utilize a series of wings assembled in a linear design that are positioned perpendicular to a central axis of the light fixture to preserve the cross-flow heat sink.

Embodiments may utilize a light fixture that has greater length than width, wherein the width may be smaller than three inches. In embodiments, a plurality of light fixtures may be coupled together to create larger fixtures. The additional light fixtures may be coupled in a lengthwise fashion, or connected adjacent to the narrow axis of the light fixtures with an air gap between each of the light fixtures.

Embodiments of the light fixture may include a housing, light sources, and heat sink.

The housing may be a case, support, shell, etc. that is configured to hold and secure the elements of the light fixture in place. In embodiments, the housing may be configured to be secured above an area of interest, wherein the area of interest may include plants positioned below the housing.

The light source may be an artificial light source that is configured to stimulate plant growth by emitting light. For example, the light source may be LEDs. The light source may be utilized to create light or supplement natural light to the area of interest. The light source may provide a light spectrum that is similar to the sun, or provide a spectrum that is tailored to the needs of particular pants being cultivated.

The heat sink may be a passive heat exchange that is configured to cool the light fixture by dissipating heat into the surrounding air. The heat sink may be configured to maximize its surface area in contact with the surrounding air with wings. The wings may be a plurality of extrusions, projections, etc. that extend across the width of the light fixture, wherein the wings are positioned at even intervals along the central axis of the light figure. The wings may be positioned above the light source, and have lower and upper surfaces. The lower surfaces may be positioned below the sidewalls of the housing and may have upper surfaces may be positioned above the sidewalls of the housing.

While operating, the light source may create heated air. As the air is being heated, the heated air may move from the edges of the wings towards the central axis of the housing. When the heated air is positioned proximate to the central axis of the housing, the heated air may rise towards the top of the wing and dissipates into the environment. Accordingly, by positioning the wings across the width of the heat sink, the heated air is only required to move horizontally a distance that is half the width of the housing before reaching the central axis.

Alternatively, when using conventional heat sinks with wings that extend across the length of the housing, the heated air is required to move a much larger distance.

However, requiring air to move a distance greater than a certain length, conventional heat sinks become very inefficient for dissipating heat.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
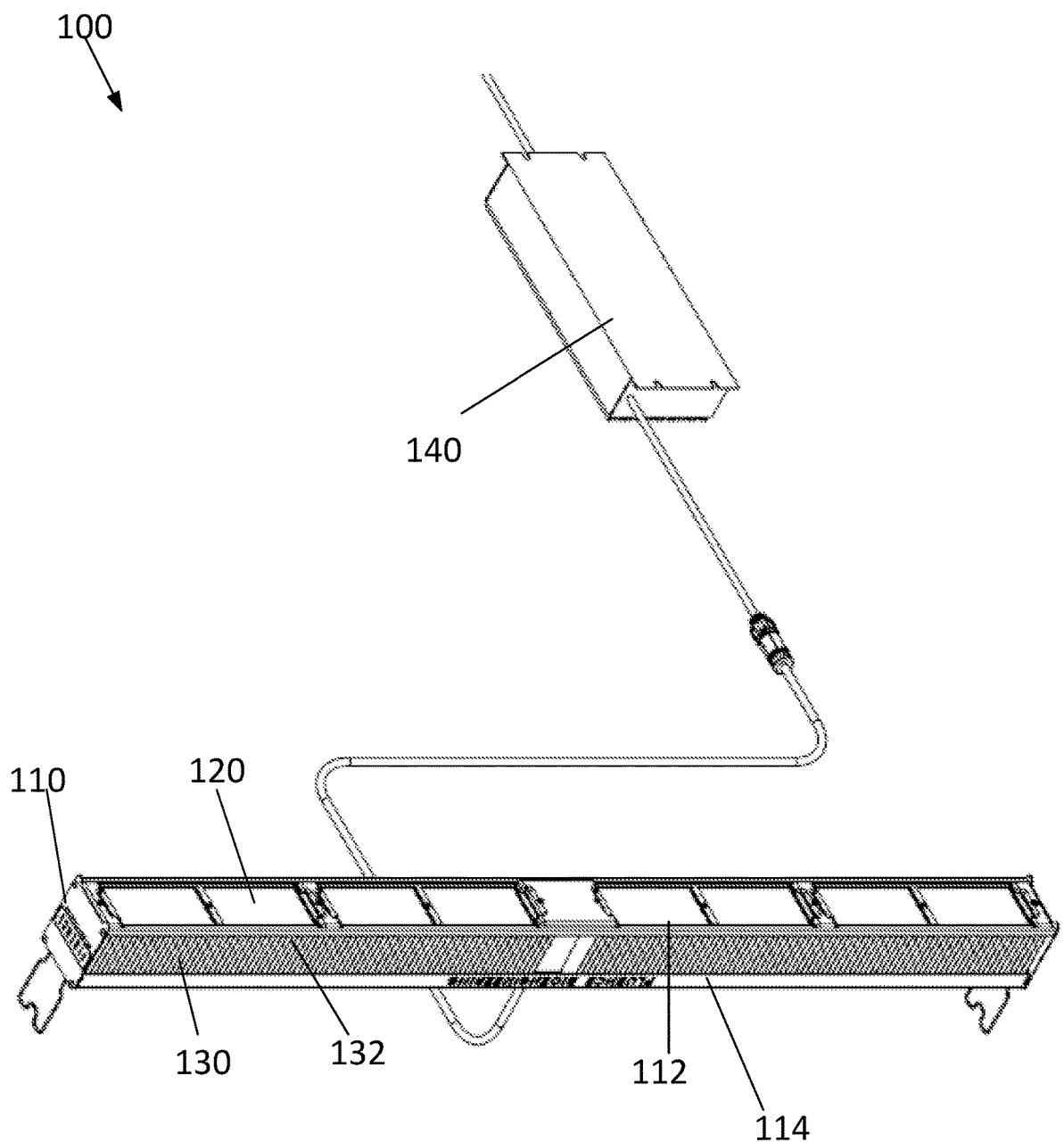
FIG. 1 depicts a light fixture, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for heat sinks within light fixtures. In embodiments, the heat sink may be a passive system that creates a cross-flow thermal management system configured to dissipate large amounts of heat in a slim light fixture. Embodiments may utilize a series of wings assembled in a linear design that are positioned perpendicular to the length of the light fixture to preserve the cross-flow heat sink.

FIG. 1 depicts one embodiment of a light fixture 100. Light fixture 100 may include a housing 110, light sources 120, and a heat sink 130.

Housing 110 may be a case, support, shell, etc. that is configured to hold and secure the elements of light fixture 100 in place. Housing 110 may be configured to be secured above an area of interest below housing 110, wherein the area of interest may include plants. Housing 110 may include lower sidewalls 112 and upper sidewalls 114. Lower sidewalls 112 may be configured to be positioned adjacent to a lower surface of light fixture 100, and upper sidewalls 114 may be configured to be positioned adjacent to an upper surface of light fixture 100. In embodiments, light sources 120 may be held in place and secured within housing 110 via lower sidewalls 112. Heat sink 130 may be held in place and secured within housing 110 via lower sidewalls 112 and upper sidewalls 114.

Light source 120 may be an artificial light source that is configured to stimulate plant growth by emitting light. For example, light source 120 may be a plurality of LEDs. Light source 120 may be utilized to create light or supplement natural light to the area of interest. Light source 120 may provide a light spectrum that is similar to the sun, or provide a spectrum that is tailored to the needs of particular pants being cultivated. Light source 120 may be positioned on a lower surface of light fixture 100, which may be between two lower sidewalls 112 of housing 110. Light source 120 may be positioned in arrays that extend from a first end of housing 110 to a second end of housing 110.

In embodiments, light source 120 may be controlled by processors or other computing devices 140, wherein in operation light source 120 may consume more than two hundred watts. Responsive to light source 120 receiving power and emitting light, light source 120 may generate heat. The generated heat may increase the temperature of the air surrounding and/or above light source 120. The increase in temperature may affect the operation of light source 120. Accordingly, for light source 120 to function efficiently, it may be required to effectively control the dissipation of heat caused by light source 120.

Heat sink 130 may be a passive heat exchange that is configured to cool the air surrounding light fixture 100 by dissipating heat into the surrounding air. Heat sink 130 may be configured to maximize its surface area in contact with the surrounding air, by including a plurality of wings 132. Wings 132 may be a plurality of extrusions, projections, etc. that are positioned at even intervals from a first end of housing 110 to a second end of housing 110. Additionally, wings 132 may be positioned above light source 120 from the first end to the second end of housing 110. Wings 132 may have lower surfaces that are positioned adjacent to lower sidewalls 112 of housing 110, and may have upper surfaces that are positioned adjacent to upper sidewalls 114 of housing 110. In embodiments, wings 132 may be positioned in a directional that is perpendicular to the central axis of light fixture 100, such that wings extend across the central axis.

In operation, as light source 120 is turned on, light source 120 may create heated air. As the air is being heated, the heated air may move from a position adjacent to lower sidewalls 112 of housing 110 towards a central axis of the housing 110. When the heated air is positioned proximate to the central axis of housing 110, the heated air may rise towards the top of a wing 132 and dissipate into the environment. Accordingly, by positioning wings 132 across the entire width of the heat sink 130, the heated air is only required to move horizontally a length that is half the width of housing 110. This may limit the maximum distance the heated air moves before rising due to convection. Furthermore, because wings 132 are positioned across the shorter axis of heat sink 130, the distance travelled by the heated air may be minimized.

Figure 2:
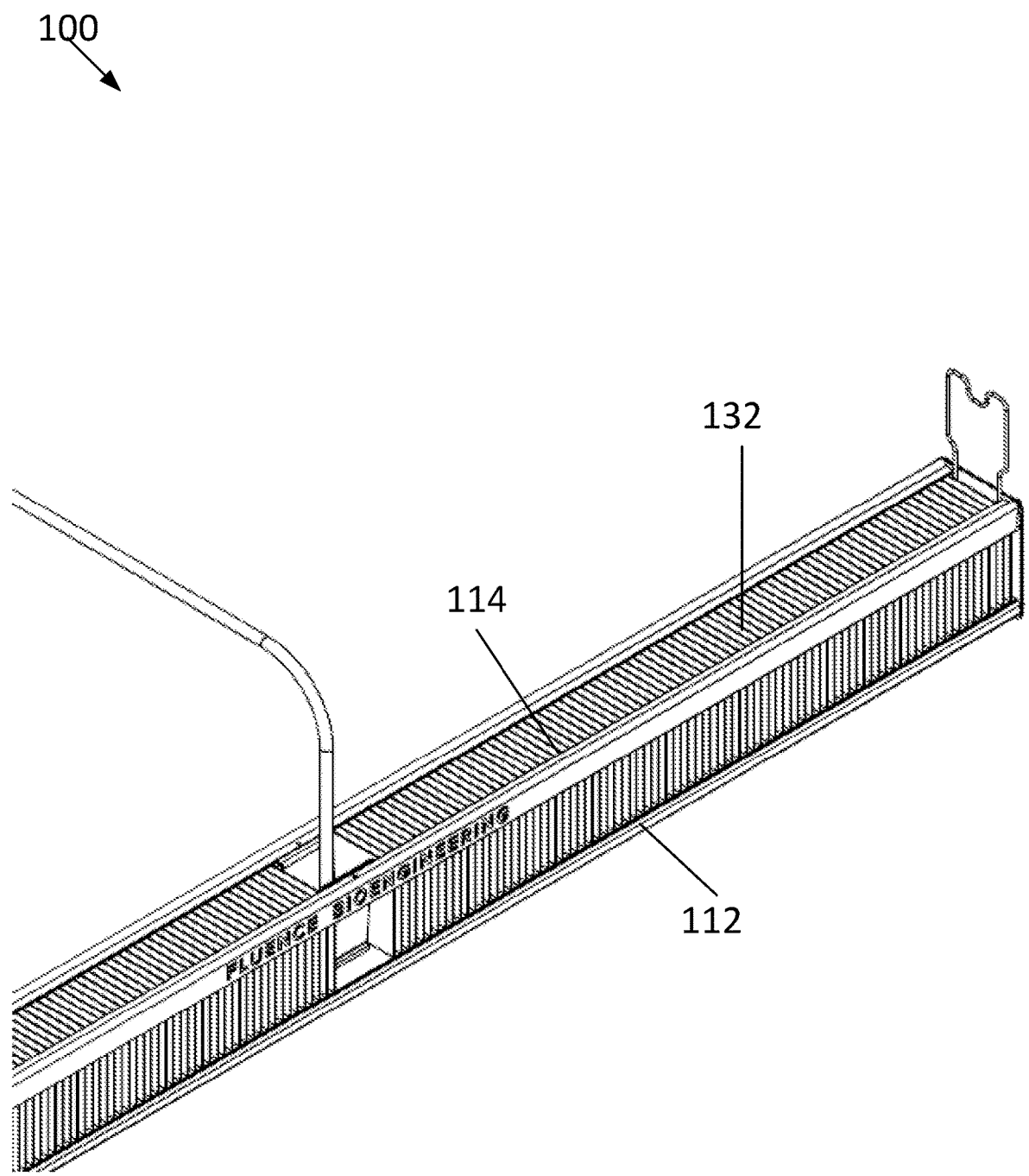
FIG. 2 depicts a light fixture, according to an embodiment.

FIG. 2 depicts one embodiment of a light fixture 100. As depicted in FIG. 2, housing 110 may include open areas between lower sidewall 112 and upper sidewall 114. The openings may allow each wing 132 may have three open edges where heated air may enter or be removed from heat sink 130. This may increase the volume of heated air impacted by heat sink 130. Furthermore, by arranging a plurality of wings 132 across the width of housing 110, the surface area of the faces of wings 132 may be maximized, which may improve the cross flow of heated air to dissipate heat more efficiently.

Figure 3:
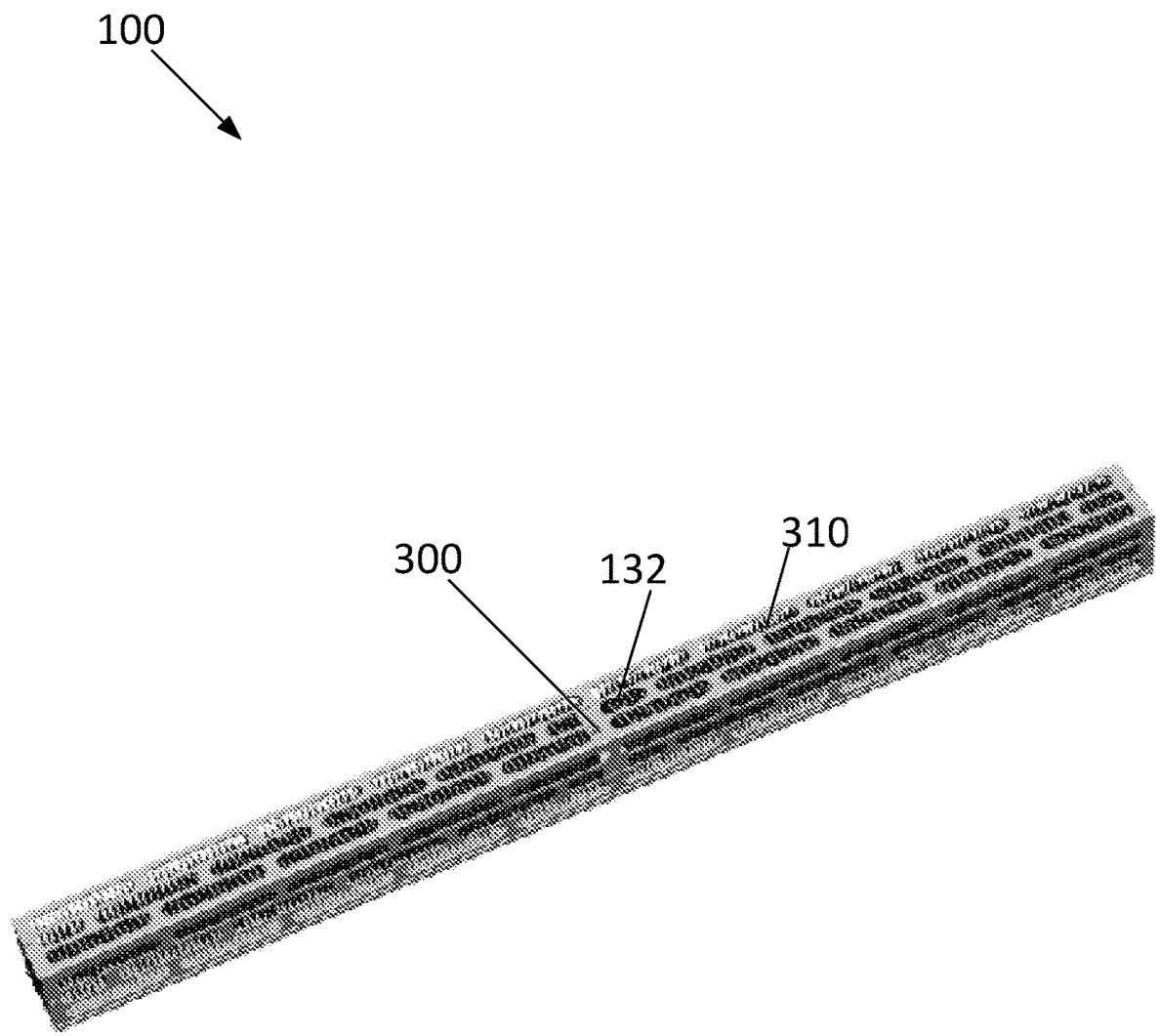
FIG. 3 depicts a light fixture with a vented housing, according to an embodiment.

FIG. 3 depicts one embodiment of light fixture 100 with vented housing 300. Vented housing 300 may be configured to encompass the outer edges of wings 132 that are not already covered by light source 110. Vented housing 300 may include a plurality of orifices 310 that are aligned at even, and offset, intervals from a first side of light fixture 100 to a second side of light fixture 100. The plurality of offices 310 may cover greater than fifty percent of the surface area of vented housing 300. In embodiments, a first row of orifices 310 may be offset from a second row of orifices 310. Accordingly, adjacent rows of orifices 310 may be misaligned. The misalignment of the rows of orifices 310 may be configured to increase cross flow of heated air dissipating into the environment surrounding light fixture 100.

Figure 4:
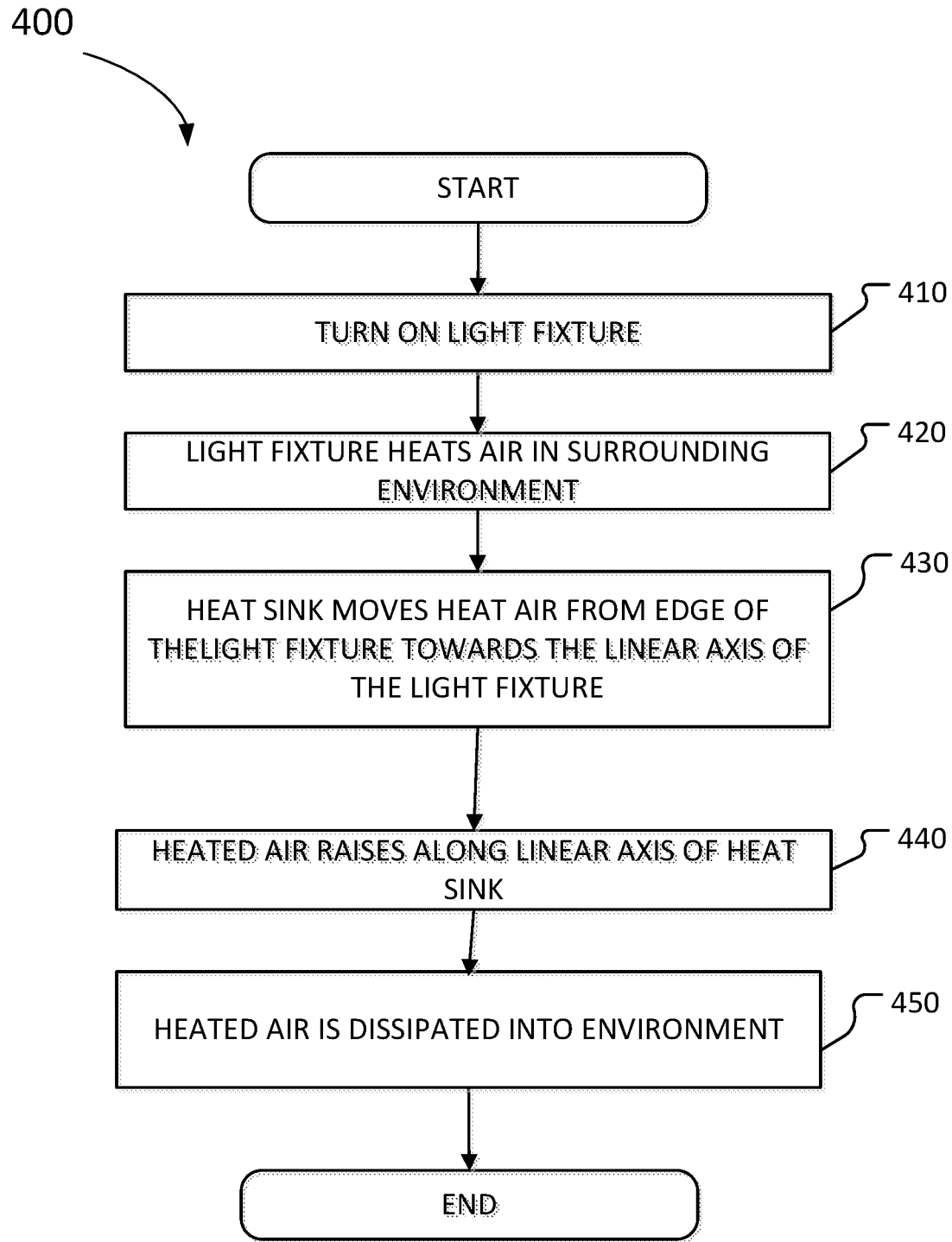
FIG. 4 depicts a method for dissipating heat into an environment, according to an embodiment.

FIG. 4 illustrates a method 400 for dissipating heat into an environment. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

At operation 410, a light fixture within a greenhouse may be turned on.

At operation 420, responsive to the light fixture being turned on, the light fixture may heat the air in the environment surrounding the light fixture.

At operation 430, when the air is heated, due to convection, the heated air may travel from the edges of a heat sink towards a central axis of the light fixture. In embodiments, the central axis of the light fixture may be substantially longer than a width of the light fixture. Due to the width of the light fixture being substantially shorter than the central axis of the light fixture, the heated air may only be required to travel half the width of the light fixture to reach the central axis of the light fixture.

At operation 440, the heated air may travel vertically away from the light fixture at a position that is proximate to the central axis of the light fixture.

At operation 450, the heated air may move away from the light fixture and be dissipated into the environment.

Figure 5:
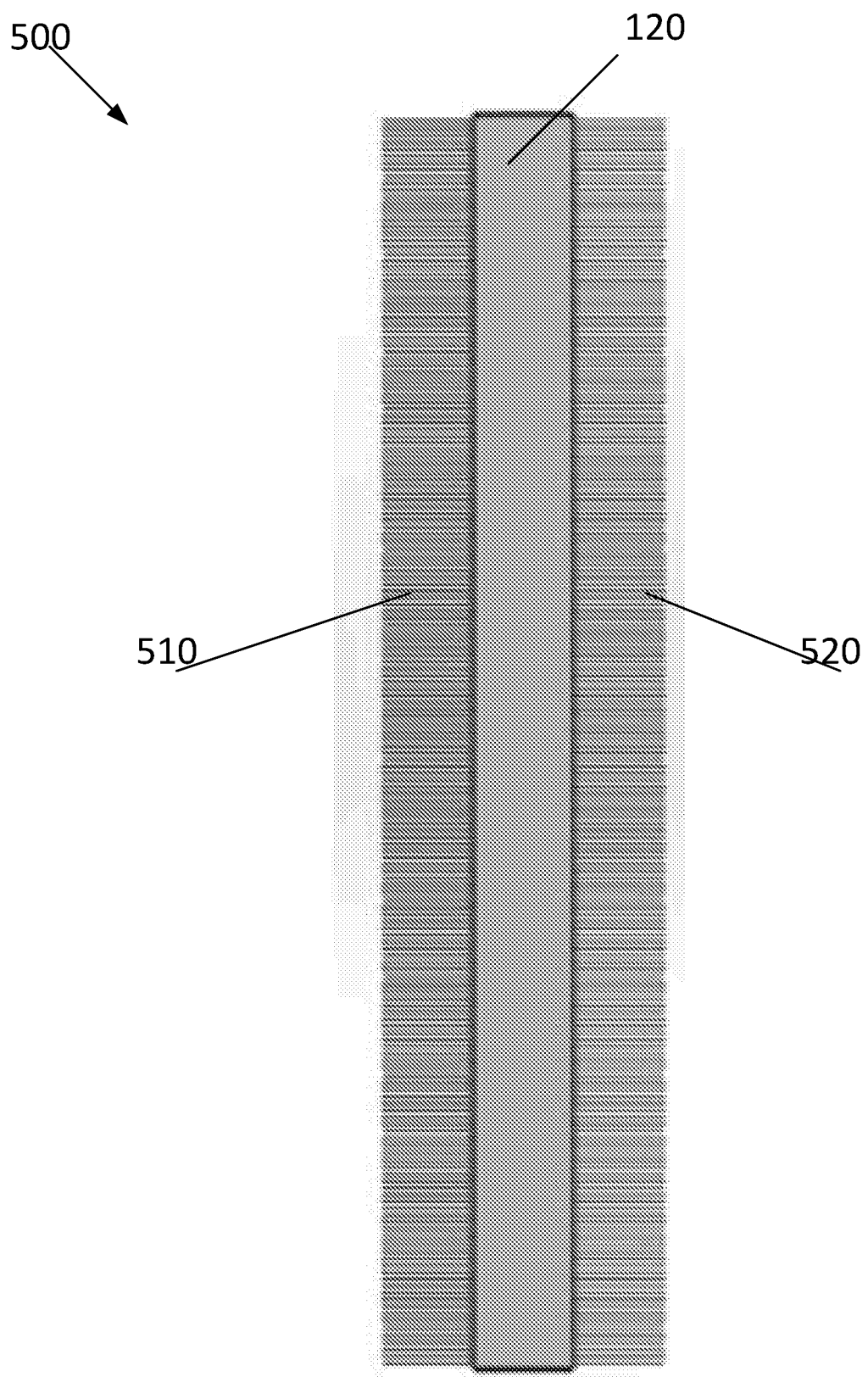
FIG. 5 depicts a bottom view of a light fixture, according to an embodiment.

FIG. 5 depicts one embodiment of a bottom view of a light fixture 500. Light fixture 100 may a light source 120, a first heat sink 510, and a second heat sink 530. Elements depicted in FIG. 5 may be discussed herein. Therefore, for the sake of brevity a further description of these elements may be omitted.

As depicted in FIG. 5, a first heat sink 510 may be positioned adjacent to a first side of light source 120, and a second heat sink 520 may be positioned adjacent to a second side of light source 120. First heat sink 510 and second heat sink 520 may have a plurality of wings that extend away from a body of a light fixture. When extending away from the body of the light fixture three of the edges of the plurality of wings may be exposed. The three exposed edges of the plurality of wings of both the first heat sink 510 and second heat sink 520 may be a lower edge, an upper edge, and a distal edge of the wings. A fourth edge of the plurality of wings of first heat sink 510 and second heat sink 520, that are proximal to light source 120, may be covered by light source 120. Accordingly, the wings associated with first heat sink 510 and the wings associated with heat sink 520 may have external uncovered edges and internal covered edges.

In embodiments, responsive to light source 120 heating the air 530 below light source 120 and below the exposed lower edges of the wings associated with first heat sink 510 and second heat sink 520, the heated air 530 may travel through the wings and dissipate into the environment above light fixture 500. Due to the surface area created by the plurality of wings, the heated air 530 may travel through first heat sink 510 and second heat sink 520 quicker. Furthermore, first heat sink 510 and second heat sink 520 may be configured to control the direction of the dissipating heat into the environment.

Figure 6:
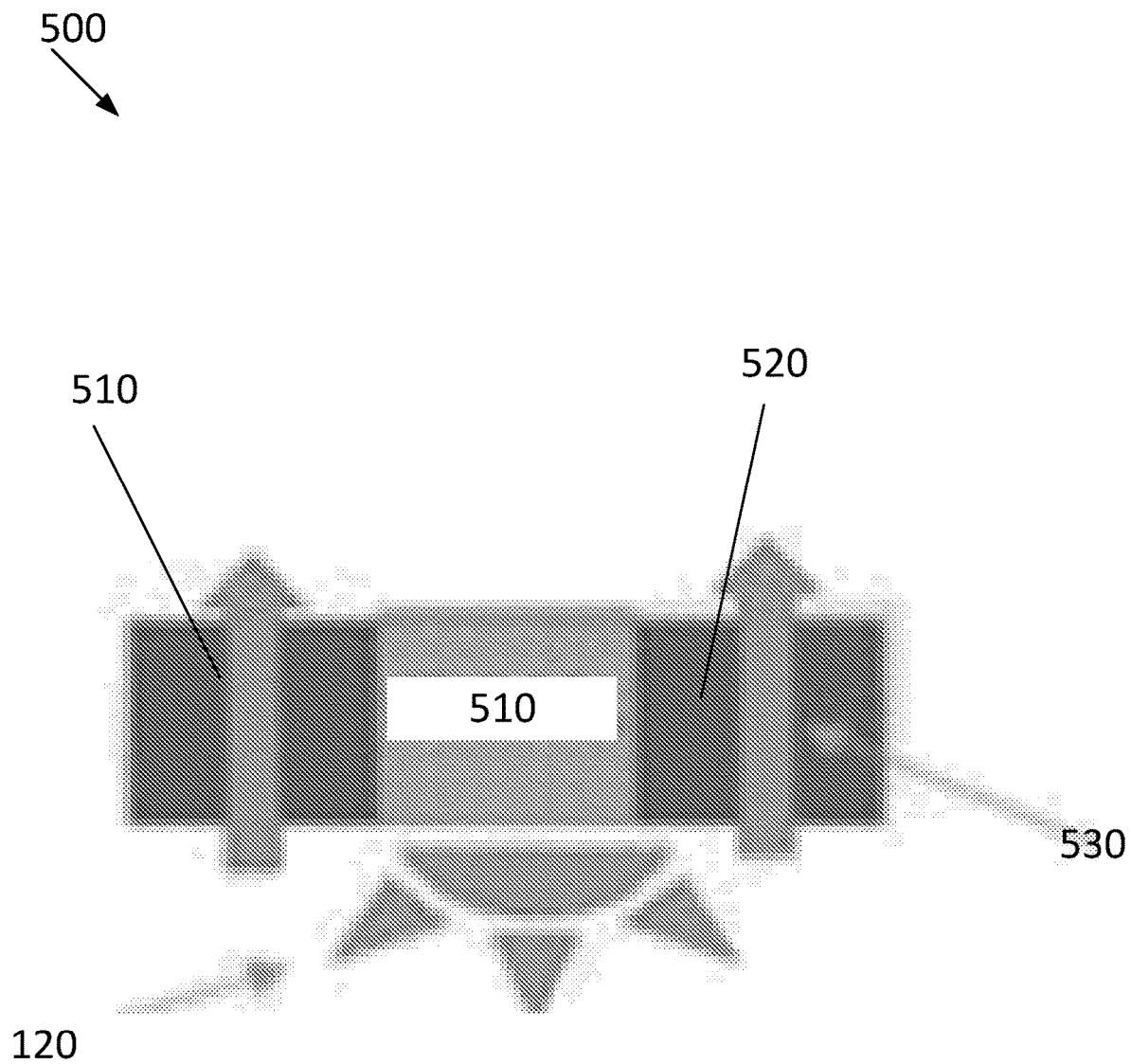
FIG. 6 depicts a front view of a light fixture, according to an embodiment.

FIG. 6 depicts one embodiment of a front view of light fixture 500. As depicted in FIG. 6, responsive to light being emitted from light source 510, the temperature of the air below light fixture 510 may increase. Then, the heat air may be dissipated into the environment above light fixture 500 after the heated air traverses first heat sink 510 and second heat sink 520.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A horticultural light fixture having a cross-flow thermal management system comprising:
 a heat sink positioned above a heat generating source, the heat source comprising a light source having an emission spectrum adapted to stimulate plant growth, the heat sink having a longitudinal axis from a first end of the heat sink to a second end of the heat sink, the heat sink including a plurality of wings extending across the longitudinal axis of the heat sink the wings being in thermal communication with the heat sink.

2. The horticultural light fixture of claim 1, wherein the plurality of wings is positioned at even intervals between the first end of the heat sink to the second end of the heat sink.

3. The horticultural light fixture of claim 1, wherein the plurality of wings is positioned orthogonal to the longitudinal axis of the heat sink.

4. The horticultural light fixture of claim 1, wherein the light source comprises a plurality of LEDs.

5. The horticultural light fixture of claim 1, further comprising:
 a housing configured to secure the heat generating source and the heat sink in place, the heat generating source being positioned on a lower surface of the housing, and the plurality wings extend from the lower surface to an upper surface of the housing.

6. The horticultural light fixture of claim 1, wherein the heat generating source covers at least a portion of a lower edge of the plurality of wings.

7. The horticultural light fixture of claim 1, further comprising:
 a housing configured to house the plurality of wings, the housing including a plurality orifices.

8. The horticultural light fixture of claim 7, wherein the plurality of orifices cover less than least fifty percent of a surface area of the housing.

9. The horticultural light fixture of claim 7, wherein a first orifice is misaligned vertically and horizontally with a second orifice, the plurality of orifices including the first orifice and the second orifice.

10. The horticultural light fixture of claim 1, wherein the heat generating source is configured to generated heated air, and the heated air moves from a position adjacent to outer edges of the plurality of wings towards the longitudinal axis of the heat sink.

11. The horticultural light fixture of claim 1, wherein each said wing extends across the longitudinal axis of the heat sink.

12. The horticultural light fixture of claim 1, wherein each said wing is formed as a lamella.

13. A method for using a horticultural light fixture having a cross-flow thermal management system comprising:
 generating, via a heat generating source comprising a light source, heated air and emitted light having a spectrum adapted to stimulate plant growth; and
 positioning a heat sink above the heat generating source, the heat sink having a longitudinal axis from a first end of the heat sink to a second end of the heat sink, the heat sink including a plurality of wings, each said wing extending across the longitudinal axis of the heat sink.

14. The method of claim 13, further comprising:
 positioning the plurality of wings at even intervals between the first end of the heat sink to the second end of the heat sink.

15. The method of claim 13, further comprising:
 positioning the plurality of wings orthogonal to the longitudinal axis of the heat sink.

16. The method of claim 13, wherein the light source comprises a plurality of LEDs.

17. The method of claim 13, further comprising:
 securing the heat sink and the heat generating source in place via a housing, the heat generating source being positioned on a lower surface of the housing, and the plurality wings extend from the lower surface to an upper surface of the housing.

18. The method of claim 13, wherein the heat generating source covers at least a portion of a lower edge of the plurality of wings.

19. The method of claim 13, further comprising:
 positioning the plurality of wings within a housing, the housing including a plurality orifices.

20. The method of claim 19, wherein the plurality of orifices cover less than least fifty percent of a surface area of the housing.

21. The method of claim 19, wherein a first orifice is misaligned vertically and horizontally a second orifice, the plurality of orifices including the first orifice and the second orifice.

22. The method of claim 13, further comprising:
 moving the heated air from a position adjacent to outer edges of the plurality wings towards the longitudinal axis of the heat sink.

23. The method of claim 13, further comprising forming the wings in thermal communication with the heat sink.

24. The method of claim 13, further comprising forming each said wing as a lamella.

25. A horticultural light fixture with a thermal management system comprising:
 a light source configured to emit light having an emission spectrum adapted to stimulate plant growth and generate heated air responsive to emitting the light;
 a heat sink positioned above the light source, the heat sink being configured to passively dissipate the heated air generated by the light source, the heat sink including a plurality of wings, the plurality of wings being positioned at intervals along a central axis of the heat sink and each said wing extending across a minor axis of the heat sink, wherein the central axis is longer than the minor axis; and
 a housing configured to secure the light source and the heat sink in place, the light source being positioned on a lower surface of the housing, and the plurality of wings extending from the lower surface to an upper surface of the housing.

26. The light fixture of claim 25, wherein the intervals are repeating intervals.

27. The light fixture of claim 26, wherein the intervals are even intervals.

28. The horticultural light fixture of claim 25, wherein the light source, in operation, dissipates more than 200 Watts.

29. The horticultural light fixture of claim 28, wherein the housing further comprises an electrical cable extending away therefrom and in operative association with the light source.

30. The horticultural light fixture of claim 25, wherein the housing secures the light source and the heat sink in fixed spatial relationship to one another.

31. The horticultural light fixture of claim 25, wherein the housing comprises an end wall having a mounting element configured to suspend the light fixture above an area of interest to be illuminated.

32. The horticultural light fixture of claim 25, wherein a width of the plurality of wings is less than three inches.

33. The horticultural light fixture of claim 25, wherein the wings have a width across the minor axis that is about equal to their height dimension, the height dimension being in a direction away from the light source and transverse to the central axis.

34. The horticultural light fixture of claim 25, wherein a width of the plurality of wings is less than three inches.

35. The horticultural light fixture of claim 25, wherein the wings are in thermal communication with the heat sink.

36. The horticultural light fixture of claim 25, wherein each said wing is formed as a lamella.

37. A horticultural light fixture with a cross-flow thermal management system comprising:
   a light source configured to emit light having an emission spectrum adapted to stimulate plant growth and generate heated air responsive to emitting the light;
   a heat sink positioned above the light source, the heat sink being configured to passively and continuously dissipate the heated air generated by the light source, the heat sink including a plurality of wings, the plurality of wings being positioned at even intervals along a central axis of the heat sink and each said wing extending across a minor axis of the heat sink, wherein the central axis is longer than the minor axis, and wherein a length of the light fixture divided by a width of the light fixture is a number greater than one.

38. The horticultural light fixture of claim 37, wherein the length of the light fixture divided by the width of the light fixture is about 16:1.

39. The horticultural light fixture of claim 37, wherein the wings are in thermal communication with the heat sink.

40. The horticultural light fixture of claim 37, wherein each said wing is formed as a lamella.

41. A light fixture with a cross-flow thermal management system comprising:
   a light source configured to emit light and generate heated air responsive to emitting the light;
   a heat sink positioned above the light source, the heat sink being configured to passively and continuously dissipate the heated air generated by the light source, the heat sink including a plurality of wings in thermal communication with the heat sink, the plurality of wings being positioned at intervals along a central axis of the heat sink and extending across a minor axis of the heat sink, wherein the central axis is longer than the minor axis, and wherein a width of the plurality of wings is less than three inches.

42. The light fixture of claim 41, wherein the intervals are repeating intervals.

43. The light fixture of claim 42, wherein the intervals are even intervals.

44. The horticultural light fixture of claim 41, wherein each said wing extends acres the minor axis of the heat sink.

45. The horticultural light fixture of claim 41, wherein each said wing is formed as a lamella.

46. A method of using a light fixture with a cross-flow thermal management system, the method comprising:
   generating heated air responsive to a light source emitting light;
   passively and continuously dissipating the heated air generated by the light source via a heat sink positioned above the light source, the heat sink including a plurality of wings in thermal communication with the heat sink, the plurality of wings being positioned at intervals along a central axis of the heat sink and extending across a minor axis of the heat sink, wherein the central axis is longer than the minor axis; and
   securing the light source and the heat sink to a housing, the light source being positioned on a lower surface of the housing, and the plurality of wings extending from the lower surface to an upper surface of the housing.

47. The method of claim 46, wherein the intervals are repeating intervals.

48. The method of claim 47, wherein the intervals are even intervals.

49. The method of claim 46, further comprising each said wing extending across the minor axis of the heat sink.

50. The method of claim 46, further comprising forming each said wing as a lamella.

51. A method of using a light fixture with a cross-flow thermal management system, the method comprising:
   generating heated air responsive to a light source emitting light;
   passively and continuously dissipating the heated air generated by the light source via a heat sink positioned above the light source, the heat sink including a plurality of wings, the plurality of wings being positioned at intervals along a central axis of the heat sink and each said wing extending across a minor axis of the heat sink, wherein the central axis is longer than the minor axis; and wherein a width of the plurality of wings is less than three inches.

52. The method of claim 51, wherein the intervals are repeating intervals.

53. The method of claim 51, wherein the intervals are even intervals.

54. The method of claim 51, further comprising forming the wings in thermal communication with the heat sink.

55. The method of claim 51, further comprising forming each said wing as a lamella.

\* \* \* \* \*